United States Patent
Kawakami et al.

(10) Patent No.: US 9,752,046 B2
(45) Date of Patent: Sep. 5, 2017

(54) AQUEOUS HYDROPHILIC COATING COMPOSITION CAPABLE OF FORMING COATING FILM HAVING EXCELLENT SELF-CLEANING ABILITY AGAINST STAINS ADHERED THEREON, AND SURFACE-TREATED MATERIAL HAVING FORMED THEREON COATING FILM HAVING EXCELLENT SELF-CLEANING ABILITY AGAINST STAINS ADHERED THEREON

(71) Applicant: Nihon Parkerizing Co., Ltd., Tokyo (JP)

(72) Inventors: Katsuyuki Kawakami, Tokyo (JP); Hiroshi Iwasaki, Tokyo (JP); Yasuhiro Kinoshita, Tokyo (JP)

(73) Assignee: Nihon Parkerizing Co., Ltd., Tokyo (JP)

( * ) Notice: Subject to any disclaimer, the term of this patent is extended or adjusted under 35 U.S.C. 154(b) by 138 days.

(21) Appl. No.: 14/777,755

(22) PCT Filed: Mar. 5, 2014

(86) PCT No.: PCT/JP2014/055579
§ 371 (c)(1),
(2) Date: Sep. 17, 2015

(87) PCT Pub. No.: WO2014/148254
PCT Pub. Date: Sep. 25, 2014

(65) Prior Publication Data
US 2016/0115342 A1      Apr. 28, 2016

(30) Foreign Application Priority Data

Mar. 21, 2013 (JP) .................. 2013-057777

(51) Int. Cl.
| | |
|---|---|
| C09D 139/06 | (2006.01) |
| C08K 3/36 | (2006.01) |
| C08K 9/06 | (2006.01) |
| C09D 129/04 | (2006.01) |
| C09D 133/02 | (2006.01) |
| C09D 5/02 | (2006.01) |
| C09D 7/12 | (2006.01) |
| C09D 201/00 | (2006.01) |
| C09J 133/24 | (2006.01) |
| C09D 4/00 | (2006.01) |
| C09D 133/26 | (2006.01) |
| C08F 230/08 | (2006.01) |

(52) U.S. Cl.
CPC .............. *C09D 139/06* (2013.01); *C08K 3/36* (2013.01); *C08K 9/06* (2013.01); *C09D 4/00* (2013.01); *C09D 5/02* (2013.01); *C09D 7/12* (2013.01); *C09D 129/04* (2013.01); *C09D 133/02* (2013.01); *C09D 133/26* (2013.01); *C09D 201/00* (2013.01); *C09J 133/24* (2013.01); *C08F 2230/085* (2013.01)

(58) Field of Classification Search
None
See application file for complete search history.

(56) References Cited

FOREIGN PATENT DOCUMENTS

| | | | |
|---|---|---|---|
| CN | 101153126 A | 4/2008 | |
| CN | 102822290 A | 12/2012 | |
| JP | 2001-164175 A | 6/2001 | |
| JP | 2001-172547 A | 6/2001 | |
| JP | 2003-206416 A | 7/2003 | |
| JP | 2005-162533 A | 6/2005 | |
| JP | 2005-298570 A | 10/2005 | |
| JP | 2009-127028 A | 6/2009 | |
| JP | 2009-255566 A | 11/2009 | |
| JP | 2011/225967 A | 11/2011 | |
| TW | 200306362 A | 11/2003 | |
| WO | 03/085171 A1 | 10/2003 | |
| WO | WO 03085171 A1 * | 10/2003 | ............... C09D 1/04 |
| WO | 2009/044912 A1 | 4/2009 | |
| WO | 2009/144999 A1 | 12/2009 | |
| WO | 2010/070728 A1 | 6/2010 | |
| WO | 2011/122119 A1 | 10/2011 | |
| WO | WO 2011122119 A1 * | 10/2011 | ............. C09D 5/082 |

OTHER PUBLICATIONS

English Machine Translation of WO2011122119A1, Mar. 22, 2017.*
English Machine Translation of WO03085171, Mar. 22, 2017.*
English translation of International Preliminary Report on Patentability dated Oct. 1, 2015, by the International Bureau of WIPO, in related International Application No. PCT/JP2014/055579 (6 pages).
Official Action dated Jul. 18, 2016, issue by The State Intellectual Property Office of The People's Republic of China in related Chinese Patent Application No. CN-201480015850.7, with English machine-translation (19 pages).
Official Action dated Jul. 26, 2016, issued by the Japan Patent Office in related Japanese Patent Application No. JP 2013-057777, with English machine-translation (6 pages).
Office Action dated in Korean Application No. 10-2015-7029961; Dated Dec. 30, 2016 with translation (11 pages).
International Search Report issued in corresponding application No. PCT/JP2014/055579 dated May 13, 2014 (1 page).

* cited by examiner

*Primary Examiner* — Christopher M Rodd
(74) *Attorney, Agent, or Firm* — Osha Liang LLP

(57) ABSTRACT

A water-based hydrophilic coating composition is characterized in that it is obtained by adding to a liquid medium: an inorganic compound (A) with colloidal silica (a) modified with at least one or more of organoalkoxysilane compounds (b) having one or more groups selected from the group consisting of a glycidyl group, a vinyl group and an amino group; a water-soluble resin (B); and amorphous silica (C) represented by $M_2O.SiO_2$, where the mass ratio of $M_2O/SiO_2$ is from 0.05 to 0.3.

14 Claims, No Drawings

AQUEOUS HYDROPHILIC COATING COMPOSITION CAPABLE OF FORMING COATING FILM HAVING EXCELLENT SELF-CLEANING ABILITY AGAINST STAINS ADHERED THEREON, AND SURFACE-TREATED MATERIAL HAVING FORMED THEREON COATING FILM HAVING EXCELLENT SELF-CLEANING ABILITY AGAINST STAINS ADHERED THEREON

CROSS REFERENCE TO RELATED APPLICATIONS

This is a national stage application based on PCT/JP2014/055579, filed on Mar. 5, 2014, which claims priority to Japanese application No. 2013-057777, filed on Mar. 21, 2013. This application claims the priority and benefits of these prior applications and incorporates their disclosures by reference in their entireties.

TECHNICAL FIELD

The present invention relates to a hydrophilic coating composition which forms a coating film that is excellent in self-cleaning ability against stains adhered thereon. More particularly, the present invention relates to a surface-treated coating film of a hydrophilic coating composition which is favorable in sustaining hydrophilicity for a long period of time, and excellent in self-cleaning ability to easily remove even lipophilic adhered substances such as penetrative oil stains, to a water-based hydrophilic coating composition for forming the surface-treated coating film, and so on.

BACKGROUND ART

Conventionally, metallic materials and plastic products coated or surface-treated for maintaining the quality or designs are used for home appliances and building materials used by us. While most of stains that are adhered on the metallic materials and the plastic products can be removed by using household or industrial cleaner, it may take time to remove the stains depending on the types of the stains, and in some cases, there is a possibility of decreasing the quality and designs of the home appliances and building materials.

Methods for easily removing the adhered strains include a method of providing a condition in which stains themselves are unlikely to be adhered on the surface of a coating film, such as fluorine resin coatings, and a method of degrading stains adhered on the surface of a coating film by photocatalytic power of titanium oxide, such as photocatalyst coatings. However, the coatings that utilize a water repellent effect, such as fluorine resin coatings are less effective for oily contaminants, and also low in sustaining self-cleaning ability. In addition, the photocatalytic coatings have an ability to decompose an organic substance and remove the stain through excitation light, but fail to develop the ability, due to insufficient strength of the coatings themselves, or ever unless the coatings are irradiated with light. Moreover, these coatings are expensive as compared with conventionally used coatings, thus often limited in intended application.

While methods for easily removing adhered stains other than these methods include a method of making a surface hydrophilic, thereby making adhered stains thereon likely to be removed along with water, there is generally a problem of difficulty in maintaining hydrophilicity over a long period of time.

In order to solve such problems, various methods have been proposed. For example, Patent Literature 1 proposes an antifouling coating liquid containing inorganic oxide microparticles and a surfactant dispersed in a volatile solvent. Coating films obtained by using the antifouling coating liquid have favorable hydrophilicity immediately after the formation of the coating films, but have problems with sustaining hydrophilicity because the surfactant is washed away along with water over time. In addition, the treatment liquid is based on a solvent composed of the volatile solvent, and also not preferable in terms of VOC regulations, working environment, and environmental problem.

Patent Literature 2 proposes an inorganic coating composition containing alumina particles of 20 to 400 nm in average particle size, a silicate oligomer with 95% or more of alkali metals being removed therefrom, or colloidal silica obtained by aging of the oligomer, a surfactant, an organic solvent that is capable of swelling or dissolving an organic base material, and water. Coating films obtained by using the inorganic coating composition have favorable hydrophilicity because of containing the alumina particles, but have difficulty in, with regard to stains due to penetrative oil and the like, removal itself of the stains because the oil penetrates into the alumina particles, and have the problem of generating an odor specific to the inorganic coating films, because the colloidal silica is combined without any modification treatment.

Patent Literature 3 proposes a hydrophilic coating agent containing colloidal silica sol, an acrylic polymer having active hydrogen, a reactive coupling agent, and a curing agent for resin, and furthermore, Patent Literature 4 proposes a hydrophilic coating agent containing colloidal silica sol, an acrylic polymer having active hydrogen, a silane coupling agent, poly(lactone)polyol, a surfactant having active hydrogen, and a curing agent. Coating films obtained by using the hydrophilic coating agents have high hardness and excellent abrasion resistance, but have problems with sustaining hydrophilicity, with a solvent, and also with insufficient liquid stability.

Patent Literature 5 proposes a hydrophilizing agent containing a silicate of a metal selected from alkali metals and alkaline-earth metals, PVA, and an acrylic resin. Patent Literature 6 proposes a hydrophilizing agent containing colloidal silica, PVA, and an acrylic resin which is neutralized with an alkali metal or an alkaline-earth metal to form a salt. These hydrophilizing agents have excellent hydrophilicity and corrosion resistance, but fail to develop a self-cleaning ability against adhered stains over a long period of time.

Patent Literature 7 proposes an aqueous coating hydrophilizing agent characterized in that a thermosensitive polymer that has a phase transition temperature for reversibly switching between hydrophilicity and hydrophobicity is supported on silica particles. Coating films obtained by using the aqueous coating hydrophilizing agent provide hydrophilicity over a long period of time, and however, since coating films are formed by adding silica, which has large size in diameter, into resins, oil stains and so on having permeability are likely to penetrate into the coating films, which results in failing to provide the self-cleaning ability that the inventors aim for.

CITATION LIST

Patent Literature

Patent Literature 1: JP 2003-206416 A
Patent Literature 2: JP 2005-298570 A
Patent Literature 3: WO 2009/044912
Patent Literature 4: WO 2009/144999
Patent Literature 5: JP 2001-164175 A
Patent Literature 6: JP 2001-172547 A
Patent Literature 7: JP 2009-127028 A

SUMMARY OF INVENTION

Technical Problem

The present invention is intended to solve the problems of the conventional art, and to provide a water-based hydrophilic coating composition which is favorable in sustaining hydrophilicity of coating film, and excellent in self-cleaning ability to easily remove even stains such as oil stains, having permeability.

Furthermore, the invention is intended to provide, by using the water-based hydrophilic coating composition, a surface-treated material with a coating film being formed, which is favorable in sustaining hydrophilicity of coating film, and excellent in self-cleaning ability to easily remove even stains such as oil stains, having permeability.

Solution to Problem

The inventors have intensively studied means for solving the previously mentioned problems faced by the conventional art. As a result, the inventors have found a water-based hydrophilic coating composition obtained by adding: in specific proportions, an inorganic compound with colloidal silica being modified with organoalkoxysilane having an organic functional group; a water-soluble resin; and amorphous silica represented by $M_2O.SiO_2$, where the mass ratio of $M_2O/SiO_2$ is from 0.05 to 0.3, and the present inventors accomplished the present invention.

That is, the present invention provides a water-based hydrophilic coating composition which forms a coating film that is excellent in self-cleaning ability against stains adhered thereon, characterized in that the composition is obtained by adding: an inorganic compound (A) with colloidal silica (a) being modified with at least one or more of organoalkoxysilane compounds (b) having an organic functional group (a glycidyl group, a vinyl group, an amino group); a water-soluble resin (B); and amorphous silica (C) represented by $M_2O.SiO_2$, where the mass ratio of $M_2O/SiO_2$ is from 0.05 to 0.3.

Further, the mass ratio (a/b) of the component (a) to the component (b) in the inorganic compound (A) may be from 0.25 to 4.

In addition, the mass ratio (A/B) of the inorganic compound (A) to the water-soluble resin (B) may be from 1.0 to 9.0.

Moreover, the mass ratio (C/[A+B]) of the amorphous silica (C) to the sum of the inorganic compound (A) and water-soluble resin (B) may be from 0.05 to 0.2.

Further provided are: a method for producing a surface-treated material with a coating film being formed which is excellent in self-cleaning ability against adhered stains, characterized in that the method includes a step of applying and drying the water-based hydrophilic coating composition mentioned above on the surface of a base material; and a surface-treated material characterized in that it is manufactured by this method.

Advantageous Effects of Invention

The water-based hydrophilic coating composition according to the present invention can be applied to the surface of a metal material such as iron, aluminum, and magnesium, a plastic, an outward wall, a wood, or the like, and dried to form a coating film which is favorable in sustaining hydrophilicity, and contaminants adhered on the surfaces of home appliances and building materials can be easily removed.

DESCRIPTION OF EMBODIMENTS

The following will be described hereafter in the following order.
1 Water-based Hydrophilic Coating Composition
2 Method for Using Water-based Hydrophilic Coating Composition
3 Surface-Treated Material treated with Water-based Hydrophilic Coating Composition
4 Action <<Water-Based Hydrophilic Coating Composition>>

A water-based hydrophilic coating composition according to the present invention is characterized in that it is obtained by adding: an inorganic compound (A) with colloidal silica (a) being modified with at least one or more of organoalkoxysilane compounds (b) having an organic functional group (a glycidyl group, a vinyl group, an amino group); a water-soluble resin (B); and amorphous silica (C) represented by $M_2O.SiO_2$, where the mass ratio of $M_2O/SiO_2$ is from 0.05 to 0.3. The respective raw materials will be described in detail below.

<Inorganic Compound (A)>

The inorganic compound (A) according to the present invention is a component that is obtained by mixing colloidal silica (a) with at least one or more of organoalkoxysilane compounds (b) having an organic functional group (a glycidyl group, a vinyl group, an amino group), thereby modifying the colloidal silica with the organoalkoxysilane. In the inorganic compound (A) according to the present invention, the organoalkoxysilane compound (b) having the organic functional group is physically adsorbed by a van der Waals' force or chemically adsorbed by a covalent bond, on the surface of the colloidal silica. The organic substance which is not adsorbed on the surface of the colloidal silica is unable to be immobilized on a surface-treated material obtained by applying and drying the coating composition, and easily dissolved in water, and the self-cleaning ability targeted by the inventors is thus unable to be achieved. The respective components (a) and (b) constituting the inorganic compound (A) will be described in detail below.

(Component (a))

While the colloidal silica is not particularly limited, preferred colloidal silica is obtained by forming anhydrous silicon dioxide into particulates, and into a colloid, and forming an electric double layer from the colloid and alkali ions such as sodium or ammonia, thereby stabilizing the colloid by repulsion between the particulates, and further preferred colloidal silica is obtained by reducing as much as possible the alkali component such as sodium or ammonia for use in the stabilization. The colloidal silica is preferably spherical in shape, but may form irregular shapes, chain-like shapes, or scale-like shapes. The self-cleaning ability required by the present invention sustains in a more favorable manner as the colloidal silica is finer in particle size. Specifically, the average particle size preferably falls within the range of 1 nm to 50 nm, more preferably within the range of 1 to 20 nm, and even more preferably within the range of 5 to 15 nm. In this regard, the average particle size of the colloidal silica refers to a number average particle size, which is measured by a nitrogen adsorption method.

Examples that can be used as the colloidal silica include, for example, SNOWTEX-XS, SNOWTEX-S, SNOWTEX-30, SNOWTEX-50, SNOWTEX-20L, SNOWTEX-XL, SNOWTEX-OXS, SNOWTEX-OS, SNOWTEX O, SNOWTEX-O-40, SNOWTEX OL, SNOWTEX-NXS, SNOWTEX-NS, SNOWTEX-N, SNOWTEX-N-40, SNOWTEX-CXS, SNOWTEX-C, SNOWTEX-CM, SNOWTEX-UP, SNOWTEX-OUP, and LSS35 (all from Nissan Chemical Industries, Ltd., trade names); and ADELITE AT-20A and ADELITE AT-30 (all from ADEKA CORPORATION). These may be used singly, or two or more thereof may be used in mixture.

(Component (b))

While the organoalkoxysilane compound which modifies the colloidal silica is not particularly limited, preferred examples include silane coupling agents, e.g., epoxysilanes such as 2-(3,4-epoxycyclohexyl)ethyltrimethoxysilane, 3-glycidoxypropyltrimethoxysilane, and 3-glycidoxypropyltriethoxysilane; aminosilanes such as 3-aminopropyltrimethoxysilane, 3-aminopropyltriethoxysilane, N-2-aminoethyl-3-aminopropyltrimethoxysilane, N-2-aminoethyl-3-aminopropyltriethoxysilane, N-2-aminoethyl-3-aminopropylmethyldimethoxysilane, 3-(N-phenyl) aminopropyltrimethoxysilane, and vinylsilanes such as vinyltrimethoxysilane, vinyltriethoxysilane, vinyltris(2-methoxyethoxy)silane, and vinylmethyldimethoxysilane. Among these examples, particularly preferred examples as a type of (b) are those having a glycidyl group. This is because the glycidyl group is likely to develop, through ring-opening, a cross-linking reaction with a carboxyl group, a hydroxyl group, an amino group, an acid anhydride, or the like of a resin or the like to form a denser network structure, and thus able to make a hydrophilic coating film tough, thereby effectively demonstrating the self-cleaning ability.

(Modification Approach)

The method for modifying the colloidal silica (a) with the organoalkoxysilane compound (b) is not particularly limited, but partially ionizing or oxidizing the surface of an inorganic compound by plasma treatment, corona treatment, laser irradiation, UV irradiation, or the like, and then causing the surface to physically bind or chemically bind to an organic substance, a method of causing a metal alkoxide compound to physically bind or chemically bind to an organic substance in the process of, or after dehydration condensation of the compound by a sol-gel method, a method of using the chelating action of a chelate compound, or the like may be conceivable. More specifically, an approach may be adopted such as warming and stirring the colloidal silica (a) and organoalkoxysilane (b) put in a container. The warming is preferably carried out at from 30 to 80° C. in order to efficiently accelerate hydrolysis. Examples of the approach include methods as described in, for example, in JP 2005-162533 A. Owing to this, it is possible to efficiently modify the surface of the colloidal silica.

<Water-Soluble Resin (B)>

The water-soluble resin (B) is not particularly limited, but can be arbitrarily selected depending on the intended use applied. For example, in a case of outdoor use etc. receiving direct sunlight, a vinyl chloride resin, an acrylic resin, a polycarbonate resin, or the like is used in order to avoid discoloration and alteration caused by sunlight. In a case of indoor use, a polyester resin, an acrylic resin, a urethane resin, an epoxy resin, a polyvinyl alcohol resin, a nylon resin, a polyvinylpyrrolidone resin, a phenolic resin, a polyacrylamide resin, a polyacrylic acid copolymer, or the like is used.

<Amorphous Silica (C)>

The amorphous silica (C) represented by $M_2O \cdot SiO_2$, where the mass ratio of $M_2O/SiO_2$ is from 0.05 to 0.3, is not particularly limited, but for example, silica sol produced by adding a quaternary ammonium hydroxide such as tetraethanol ammonium hydroxide and an aqueous solution of monomethyltriethanol ammonium to an aqueous silicate solution obtained from an aqueous solution of silicate-alkali metal salt, and removing the alkali metal salt through ion exchange or the like, and examples of the silica sol can include amorphous silica synthesized by removing alkali components with an ion-exchange resin or the like as much as possible. In addition, the alkali metal component M may be a metal component composed of sodium, potassium, or lithium, and in particular, a silicate with a sodium component is typically used in terms of production cost and manufacturing process. In addition, the self-cleaning ability required by the present invention sustains in a more favorable manner as the amorphous silica is finer in particle size. Specifically, the average particle size preferably falls within the range of 1 nm to 50 nm, more preferably within the range of 1 to 20 nm, and particularly preferably 7 to 15 nm. The average size of the amorphous silica powder refers to a value measured by a laser diffraction scattering method.

<Other Optional Components>

The water-based hydrophilic coating composition according to the present invention can contain, at an arbitrary proportions, a leveling agent for improving wettability to a base material, a film-forming aid for improving a film-forming property, an organic cross-linking agent and an inorganic cross-linking agent for making a coating film a more rigid film, a highly volatile water-soluble solvent for improving a drying property, a defoamer for suppressing foam formation, a thickener for controlling viscosity, a surfactant and WAX for providing a base material with a lubricating property, and further, if necessary, an anti-rust agent, an antimicrobial fungicide, a filler, a colorant, etc., as long as the addition of the optional components does not spoil the objective of the present invention or impairs the coating film performance.

<Liquid Medium>

The liquid medium contains water as its main component (for example, 90% by volume or more with the total volume of the solvent as a reference).

<Combination Ratio>

(Ratio of Component (a) to Component (b) in Component (A))

The mass ratio (a/b) of the component (a) to the component (b) in the inorganic compound (A) in which the colloidal silica (a) is modified with the organoalkoxysilane (b) is preferably from 0.25 to 4, more preferably from 0.3 to 2, and even more preferably from 0.4 to 1. When the mass ratio (a/b) of the component (a) to the component (b) in the inorganic compound (A) in which the colloidal silica is modified with the organoalkoxysilane is less than 0.25, the hydrophilicity is decreased because of the small amount of the colloidal silica component, and the self-cleaning ability also tends to decrease. On the other hand, when the mass ratio (a/b) of the component (a) to the component (b) in the inorganic compound (A) is greater than 4, the coating film becomes brittle because of the large amount of the colloidal silica component, and the self-cleaning ability may not sustain long.
(Ratio of Component (A) to Component (B))

The mass ratio (A/B) between the inorganic compound (A) to the water-soluble resin (B) is preferably from 1.0 to 9.0, more preferably from 4 to 8, and even more preferably from 6 to 7. When the mass ratio (A/B) of the inorganic compound (A) to the water-soluble resin (B) is less than 1.0, the self-cleaning ability against contaminants tends to decrease. On the other hand, when the mass ratio (A/B) of the inorganic compound (A) to the water-soluble resin (B) is greater than 9.0, the coating film is hardened to undergo a decrease in lubricating property, and fail to achieve workability. Moreover, the coating film is more likely to be cracked, and the self-cleaning ability thus also tends to decrease.
(Ratio of Component (C) to Sum of Components (A) and (B))

The mass ratio (C/[A+B]) of the amorphous silica (C) to the sum of the inorganic compound (A) and water-soluble resin (B) is preferably from 0.05 to 0.2, more preferably from 0.08 to 0.12. When the mass ratio (C/[A+B]) of the amorphous silica (C) to the sum of the inorganic compound (A) and water-soluble resin (B) is less than 0.05, the self-cleaning ability tends to sustain short, with hydrophilicity being decreased. On the other hand, when the mass ratio (C/[A+B]) of the amorphous silica (C) to the sum of the inorganic compound (A) and water-soluble resin (B) is greater than 0.2, the water resistance is decreased to make the coating film brittle, the corrosion resistance is decreased, and furthermore, the self-cleaning ability over a long period of time tends to decrease.
<Liquid Property>

The pH of the water-based hydrophilic coating composition according to the present invention preferably falls within the range of 7 to 11, more preferably 8 to 10. It may be difficult to maintain the stability of the agent when the pH is less than 7, while with the pH in excess of 11, the coating film formation may be unsuccessful, and the self-cleaning ability against adhered stains tends to decrease. In this regard, the pH refers to a value measured with a pH measuring instrument: DKK-TOA CORPORATION; pH meter MM-60R.
<<Method for Using Water-based Hydrophilic Coating Composition>>
(Target Base Material)

Target materials to which the water-based hydrophilic coating composition according to the present invention includes: metal materials such as iron, zinc, and aluminum, and metal alloys materials; coated metal materials coated for providing designs; plastic products; glass; films; outward walls of buildings; guardrails; sound insulation walls; cars; trains; airplanes; and home appliances. In particular, aluminum and aluminum alloys can be provided with excellent hydrophilicity and self-cleaning ability against adhered stains.
(Process)

The water-based hydrophilic coating composition according to the present invention can be applied to the surface of abase material as a target, and dried to provide an excellent self-cleaning ability against adhered stains. The method for applying the water-based hydrophilic coating composition according to the present invention is not particularly limited, but examples thereof include spray coating, airless spray coating, roller coating, brush coating, roll coater, shower wringer, and immersion treatment.

The method for drying the water-based hydrophilic coating composition according to the present invention is not particularly limited, but examples thereof include drying by heating with warm air or hot air from a fossil fuel or an electric heater as a heat source, drying by electron beam irradiation or ultraviolet irradiation, and natural drying.

The drying temperature for the water-based hydrophilic coating composition according to the present invention is not particularly limited, but the composition is dried at from 60 to 250° C. This temperature range can be arbitrarily varied within the range depending on the type of the resin component, the film thickness, and the base material to be coated, but preferably falls within the range of from 80 to 230° C.
<<Surface-Treated Material>>

The surface-treated material with a coating film being formed which is excellent in self-cleaning ability against adhered stains, according to the present invention, has a coating film obtained by using the water-based hydrophilic coating composition according to the present invention, on the previously mentioned base material.
(Film Thickness)

The film thickness of the coating film obtained by using the water-based hydrophilic coating composition according to the present invention preferably falls within the range of 0.05 to 50 μm, more preferably within the range of 0.2 to 20 μm. The self-cleaning ability against adhered stains is poor when the film thickness of the coating film obtained by using the hydrophilic coating composition according to the present invention is less than 0.05 μm, while when the film thickness is greater than 50 μm, it is not economical because it takes time to dry the coating film, and it elevates treatment cost. In addition, the coating film is more likely to be cracked, contaminants are thus more likely to penetrate into the coating film, and the self-cleaning ability may tend to decrease.
(Underlying Film)

The water-based hydrophilic coating composition according to the present invention is applied to the surface of the base material to form a coating film, thereby achieving favorable performance. However, for further improvement in corrosion resistance, a corrosion-resistant base layer may be provided as a base coating for the water-based hydrophilic coating composition. This corrosion-resistant base layer may be formed on the surface of the base material by chemical conversion treatment, for example, from a chemical conversion treatment agent containing at least one metal element selected from the group consisting of chromium, zirconium, titanium, and vanadium. Alternatively, a resin that can maintain corrosion resistance may be provided as a coating. The chemical conversion treatment layer is preferably formed to be from 2 to 500 mg/m$^2$ in coating film amount or from 0.002 to 0.5 μm in thickness. The coating layer of resin is preferably formed to be from 0.1 to 5 g/m$^2$ or from 0.1 to 5 μm in thickness. The water-based hydrophilic coating composition may be applied to two layers respectively subjected to chemical conversion treatment and resin coating.
<<Action>>

The coating film formed by using the water-based hydrophilic coating composition according to the present invention is favorable in sustaining hydrophilicity, and excellent in self-cleaning ability to easily remove even contaminants such as penetrative oil stains. The reason that the hydrophilic coating composition according to the present invention is excellent in self-cleaning ability for adhered stains has not been specifically defined, but presumed as follows. The inorganic compound (A) with the colloidal silica (a) being modified with at least one or more of organoalkoxysilane compounds (b) having an organic functional group (a glycidyl group, a vinyl group, an amino group) is considered to develop a cross-linking reaction with the water-soluble resin (B), and form a coating film that has a rigid three-dimensional network structure of the silanol linkage complexed with the organic functional group. Then, the dramatically improved film-forming property of the coating film can maintain the smooth continuous coating film, and the toughness of the coating film itself which can withstand even bending and stretching, thus more dramatically improving the water resistance and solvent resistance of the coating film than those of conventional coating films, and forming excellent coating films on any base material. Furthermore, containing the amorphous silica (C) represented by $M_2O \cdot SiO_2$, where the ratio of $M_2O/SiO_2$ by mass is from 0.05 to 0.3, develops hydrophilicity retention over a long period of time. In this regard, many hydroxyl groups as a hydrophilic component of the amorphous silica surface are present on the surface, and the further contained alkali metal component has the effect of keeping the surface hydrophilic to the extent that the coating film performance is not affected by the alkali metal component. In addition, the inorganic compound (A) and water-soluble resin (B) constituting a tough coating film both form, due to the complex effect obtained by promoting the cross-linkage with the silanol linkage, or due to the hydrophilic effect specific to the coating film even with contaminants adhered, a thin water film on the surface of the coating film when the surface is wet with water, thereby making water likely to penetrate into the lowermost layer of adhered stains. Because of having, under the adhered stains, the continuous coating film which has the combination of water resistance and solvent resistance, the adhered stains are considered to be easily peeled off in such a way that the stains adhered on the surface of the coating film is prevented from penetrating into the coating film to wet the coating film and penetrate water into the lowermost part of the adhered stains. In addition, an odor component generated from the adhered stains can be subjected to cleaning in the same manner, and the odor component is thus removed in the same manner. While the self-cleaning ability is as described above, the effect measurements are possible with contamination resistance recovery performance as will be described hereinafter.

EXAMPLES

The present invention will be specifically described with reference to examples and comparative examples hereinafter. These examples are intended to illustrate the present invention, but not intended to limit the present invention.
[Preparation of Test Plate]
(1) Test Material
An aluminum alloy plate (JIS A1050, plate thickness: 0.26 mm) was subjected to spray degreasing at 60° C. for 10 seconds with a 2% solution of FINECLEANER 4377 (Trade Name: alkali degreasing agent from Nihon Parkerizing Co., Ltd.), and washed with water to clean the surface. Subsequently, in order to evaporate water on the surface of the aluminum alloy plate, the plate was subjected to drying by heating at 80° C. for 1 minute. To the surface of the degreased and washed aluminum alloy plate, 5 mass % aqueous solutions of the water-based hydrophilic coating compositions according to Examples 1 to 27 and comparative examples 1 to 8 shown in Table 1 were applied by bar coating (#5 bar), and dried at 200° C. for 1 minute in a circulating hot air-type drying furnace to form coating films of the water-based hydrophilic coating compositions on the surface of the aluminum alloy plate.

The water-based hydrophilic coating compositions used were obtained by mixing the respective components shown below for the compositions as shown in Table 1. In regard to the combined amounts of the raw materials in Figure 1, the sum of the solid contents (by mass) of the raw materials contained in the water-based hydrophilic coating composition is indexed as 100 in percentage, the combination ratios of the solid contents for each raw material. As a method for preparing the water-based hydrophilic coating composition, prepared colloidal silica and organoalkoxysilane were first warmed and mixed to prepare the inorganic compound (A), and thereafter, water as a solvent and various other components were added thereto.
[Inorganic Compound A]
<Colloidal Silica>
a1: SNOWTEX OXS of from 4 to 6 nm in average particle size, from Nissan Chemical Industries, Ltd.
a2: SNOWTEX OS of from 8 to 11 nm in average particle size, from Nissan Chemical Industries, Ltd.
a3: SNOWTEX O of from 10 to 15 nm in average particle size, from Nissan Chemical Industries, Ltd.
a4: SNOWTEX OL of from 40 to 50 nm in average particle size, from Nissan Chemical Industries, Ltd.
a5: SNOWTEX OUP of from 40 to 100 nm in average particle size, from Nissan Chemical Industries, Ltd.
*It is to be noted that the range of the particle size represents the fluctuation range for each production lot.
<Organoalkoxysilane>
bio 3-glycidoxypropyltrimethoxysilane
b2: vinyltriethoxysilane
b3: N-2-(aminoethyl)-3-aminopropyltriethoxysilane
[Water-Soluble Resin]
B1: polyacrylic acid copolymer (Weight Average Molecular Weight: 10,000)
B2: polyacrylamide (Weight Average Molecular Weight: 30,000)
B3: polyvinyl alcohol (Weight Average Molecular Weight: 45,000)
B4: polyvinylpyrrolidone (Weight Average Molecular Weight: 100,000)
[Amorphous Silica]
C1: PC-500 from Nissan Chemical Industries, Ltd. ($M_2O/SiO_2=0.2$)
C2: amorphous silica prepared by mixing silicate soda No. 3 (111 g) from NIPPON CHEMICAL INDUSTRIAL CO., LTD. and SNOWTEX O (853 g) from Nissan Chemical Industries, Ltd. ($M_2O/SiO_2=0.05$)
C3: FJ294 from GRANDEX Co., Ltd. ($M_2O/SiO_2=0.292$)
*The average particle sizes are all from 10 to 12 nm
*The $M_2O/SiO_2$ stands for a mass ratio
The coated test plates were evaluated as follows.
[Evaluation Methods]
(1) Initial Hydrophilicity (Initial Contact Angle)
To the test plate, 1 μL of ion-exchanged water was delivered by drops to measure the water contact angle with a contact angle meter. Measurement Instrument: Automatic Contact Angle Meter DM-501 (from Kyowa Interface Science Co., Ltd.)
[Evaluation Criteria]
⊚: contact angle less than 20°
○: 20° or more and less than 30°
Δ: 30° or more and less than 40°
Δx: 40° or more and less than 50°
x: 50° or more (2) Sustaining Hydrophilicity (Contact Angle after Passage of Time Under Running Water)

After immersing the test plate, used in the section (1), for 24 hours in running ion-exchanged water at room temperature (25° C.), the water contact angle was measured with a contact angle meter in the same manner. Measurement Instrument: Automatic Contact Angle Meter DM-501 (from Kyowa Interface Science Co., Ltd.)

[Evaluation Criteria]

◉: contact angle less than 20°
○: 20° or more and less than 30°
Δ: 30° or more and less than 40°
Δx: 40° or more and less than 50°
x: 50° or more (3) Wettability Resistance The test piece was left for 120 hours in a rotating constant temperature and humidity bath at 50° C. and 98% RH, and the appearance after leaving the piece was visually observed.

[Evaluation Criteria]

◉: corroded area less than 10%
○: corroded area of 10% or more and less than 30%
Δ: corroded area of 30% or more and less than 50%
x: corroded area of 50% or more (4) Adhesion After the test piece was left 24 hours in a wet (temperature: 50° C., humidity: 98% RH) atmosphere, and then dried at room temperature, the coating film was cut with an NT cutter to have a grid of one hundred squares of 1 mm, and subjected to a peeling test with an adhesive tape (in accordance with JIS K5600-5-6) to evaluate the coating film in terms of the number of peelings from the coating film. The evaluation criteria are listed below.

[Evaluation Criteria]

◉: no peeling
○: the number of peelings less than 10
Δ: the number of peelings of 10 or more and less than 50
x: the number of peelings of 50 or more (5) Contamination Resistance Recovery Performance The water contact angle prior to start of test was measured, and thereafter, the test plate was left in a beaker in which a palmitic acid in imitation of a contaminant was left, and left for 24 hours in a sealed constant-temperature bath in an atmosphere at 50° C. Thereafter, the test plate was taken out, and the water contact angle was measured after leaving under running water for 1 hour. In that regard, the difference in contact angle between before and after the test (the contact angle after the test—the contact angle before the test) was evaluated as the degree of recovery.

[Evaluation Criteria]

◉: difference less than 10° in contact angle between before and after test
○: difference of 10° or more and less than 20° in contact angle between before and after test
Δ: difference of 20° or more and less than 50° in contact angle between before and after test
x: difference of 50° or more in contact angle between before and after test (6) Lubricating Workability Volatile press forming oil (Trade Name; AF-2A from Idemitsu Kosan Co., Ltd.) was applied to the test pieces, and a steel ball of 3 mmø was used with a load of 0.2 kg in a Bowden-type frictional wear testing machine to measure the initial friction coefficient (first reciprocation).

[Evaluation Criteria]

◉: friction coefficient less than 0.2
○: friction coefficient of 0.2 or more and less than 0.3
Δ: friction coefficient of 0.3 or more and less than 0.4
x: friction coefficient of 0.4 or more (7) Liquid Stability The surface treatment agents according to Examples 1 to 27 and comparative examples 1 to 8 were each enclosed in a plastic container of 200 to 300 cc, and the conditions of the agents were evaluated after still standing for 2 weeks in an atmosphere at 25° C.

[Evaluation Criteria]

○: no solidification, separation, or precipitation
Δ: no solidification or separation, but precipitation
x: solidification and separation Table 2 shows the results of the evaluations made in accordance with the above-mentioned test procedures.

TABLE 1

| | Inorganic Compound A | | | | Water-Soluble Resin B | | Amorphous Silica C | | pH of Treatment Liquid | A/B | C/[A + B] |
|---|---|---|---|---|---|---|---|---|---|---|---|
| | Colloidal Silica a | | Organo-alkoxysilane b | | | | | | | | |
| | Component | Combined Amount | Component | Combined Amount | a/b | Component | Combined Amount | Component | Combined Amount | | | |
| Example 1 | a1 | 18.5 | b1 | 61.5 | 0.30 | B2 | 11.1 | C1 | 8.9 | 9.0 | 7.2 | 0.10 |
| Example 2 | a2 | 22.9 | b1 | 57.1 | 0.40 | B2 | 11.1 | C1 | 8.9 | 9.0 | 7.2 | 0.10 |
| Example 3 | a2 | 26.7 | b1 | 53.3 | 0.50 | B3 | 11.1 | C2 | 8.9 | 9.0 | 7.2 | 0.10 |
| Example 4 | a2 | 40.0 | b1 | 40.0 | 1.00 | B3 | 11.1 | C2 | 8.9 | 9.0 | 7.2 | 0.10 |
| Example 5 | a3 | 53.3 | b2 | 26.7 | 2.00 | B3 | 11.1 | C2 | 8.9 | 9.0 | 7.2 | 0.10 |
| Example 6 | a4 | 60.0 | b1 | 20.0 | 3.00 | B3 | 11.1 | C3 | 8.9 | 9.0 | 7.2 | 0.10 |
| Example 7 | a5 | 63.3 | b3 | 16.7 | 3.80 | B4 | 11.1 | C3 | 8.9 | 9.3 | 7.2 | 0.10 |
| Example 8 | a2 | 16.9 | b2 | 33.8 | 0.50 | B2 | 42.3 | C3 | 7.0 | 8.5 | 1.2 | 0.08 |
| Example 9 | a2 | 20.3 | b2 | 40.7 | 0.50 | B3 | 30.5 | C3 | 8.5 | 8.9 | 2.0 | 0.09 |
| Example 10 | a2 | 22.6 | b1 | 45.3 | 0.50 | B3 | 22.6 | C3 | 9.4 | 9.0 | 3.0 | 0.10 |
| Example 11 | a2 | 24.0 | b1 | 48.0 | 0.50 | B3 | 18.0 | C3 | 10.0 | 9.3 | 4.0 | 0.11 |
| Example 12 | a2 | 25.2 | b1 | 50.3 | 0.50 | B3 | 15.1 | C3 | 9.4 | 9.0 | 5.0 | 0.10 |
| Example 13 | a2 | 26.1 | b1 | 52.2 | 0.50 | B3 | 13.0 | C1 | 8.7 | 9.0 | 6.0 | 0.10 |
| Example 14 | a2 | 26.6 | b1 | 53.2 | 0.50 | B4 | 11.4 | C1 | 8.8 | 9.0 | 7.0 | 0.10 |
| Example 15 | a2 | 27.0 | b1 | 53.9 | 0.50 | B4 | 10.1 | C1 | 9.0 | 9.0 | 8.0 | 0.10 |
| Example 16 | a2 | 27.2 | b1 | 54.4 | 0.50 | B4 | 9.4 | C1 | 9.1 | 9.0 | 8.7 | 0.10 |
| Example 17 | a2 | 27.9 | b1 | 55.8 | 0.50 | B1 | 11.6 | C2 | 4.7 | 8.1 | 7.2 | 0.05 |
| Example 18 | a2 | 27.6 | b1 | 55.2 | 0.50 | B2 | 11.5 | C2 | 5.7 | 8.3 | 7.2 | 0.06 |
| Example 19 | a2 | 26.7 | b1 | 53.3 | 0.50 | B3 | 11.1 | C1 | 8.9 | 9.0 | 7.2 | 0.10 |
| Example 20 | a2 | 25.5 | b1 | 51.1 | 0.50 | B3 | 10.6 | C1 | 12.8 | 10.3 | 7.2 | 0.15 |
| Example 21 | a2 | 24.7 | b3 | 49.5 | 0.50 | B3 | 10.3 | C1 | 15.5 | 10.6 | 7.2 | 0.18 |

TABLE 1-continued

| | Inorganic Compound A | | | | | Water-Soluble Resin B | | Amorphous Silica C | | pH of Treatment Liquid | A/B | C/[A + B] |
|---|---|---|---|---|---|---|---|---|---|---|---|---|
| | Colloidal Silica a | | Organo-alkoxysilane b | | | | | | | | | |
| | Component | Combined Amount | Component | Combined Amount | a/b | Component | Combined Amount | Component | Combined Amount | | | |
| Example 22 | a1 | 7.3 | b1 | 72.7 | 0.10 | B1 | 11.1 | C1 | 8.9 | 9.0 | 7.2 | 0.10 |
| Example 23 | a3 | 72.7 | b1 | 7.3 | 10.00 | B4 | 11.1 | C3 | 8.9 | 9.0 | 7.2 | 0.10 |
| Example 24 | a2 | 10.6 | b3 | 21.1 | 0.50 | B2 | 63.9 | C3 | 4.4 | 7.5 | 0.5 | 0.05 |
| Example 25 | a2 | 28.7 | b1 | 57.4 | 0.50 | B4 | 4.3 | C1 | 9.6 | 9.0 | 20.0 | 0.11 |
| Example 26 | a2 | 28.6 | b2 | 57.1 | 0.50 | B1 | 11.9 | C2 | 2.4 | 7.5 | 7.2 | 0.02 |
| Example 27 | a2 | 20.9 | b1 | 41.7 | 0.50 | B4 | 8.7 | C2 | 28.7 | 11.0 | 7.2 | 0.40 |
| Comparative Example 1 | — | — | b2 | 80.0 | — | B3 | 11.1 | C2 | 8.9 | 9.0 | 7.2 | 0.10 |
| Comparative Example 2 | a3 | 80.0 | — | — | — | B1 | 11.1 | C1 | 8.9 | 9.0 | 7.2 | 0.10 |
| Comparative Example 3 | — | — | — | — | — | B1 | 88.0 | C3 | 12.0 | 10.5 | — | 0.14 |
| Comparative Example 4 | a3 | 30.4 | b3 | 60.8 | 0.50 | — | — | C1 | 8.8 | 9.0 | — | 0.10 |
| Comparative Example 5 | a3 | 28.6 | b1 | 57.1 | 0.50 | B4 | 14.3 | — | — | 6.5 | 6.0 | — |
| Comparative Example 6 | a3 | 33.4 | b1 | 66.6 | 0.50 | — | — | — | — | 3.0 | — | — |
| Comparative Example 7 | — | — | — | — | — | B3 | 100.0 | — | — | 5.0 | — | — |
| Comparative Example 8 | — | — | — | — | — | — | — | C1 | 100.0 | 11.2 | — | — |

TABLE 2

| | Initial Contact Angle | Sustaining Hydrophilicity | Wettability | Contamination Resistance Recovery Performance | Coating Adhesion | Lubricating Workability | Liquid Stability | Comprehensive Evaluation |
|---|---|---|---|---|---|---|---|---|
| Example 1 | ○ | ○ | ◎ | ◎ | ◎ | ◎ | ○ | ◎+ |
| Example 2 | ○ | ◎ | ◎ | ◎ | ◎ | ◎ | ○ | ◎++ |
| Example 3 | ◎ | ◎ | ○ | ◎ | ○ | ◎ | ○ | ◎+ |
| Example 4 | ◎ | ◎ | ○ | ◎ | ◎ | ◎ | ○ | ◎+ |
| Example 5 | ◎ | ○ | ○ | ◎ | ○ | ○ | ○ | ◎ |
| Example 6 | ◎ | ○ | ○ | ◎ | ○ | △ | ○ | ○++ |
| Example 7 | ◎ | ○ | △ | ◎ | ○ | △ | ○ | ○++ |
| Example 8 | ○ | △ | ○ | ◎ | ◎ | ◎ | ○ | ○++ |
| Example 9 | ○ | ○ | ○ | ◎ | ◎ | ◎ | ○ | ◎ |
| Example 10 | ○ | ○ | ○ | ◎ | ◎ | ◎ | ○ | ◎ |
| Example 11 | ◎ | ◎ | ○ | ◎ | ◎ | ◎ | ○ | ◎++ |
| Example 12 | ◎ | ◎ | ○ | ◎ | ◎ | ◎ | ○ | ◎++ |
| Example 13 | ◎ | ◎ | ◎ | ◎ | ◎ | ◎ | ○ | ◎++ |
| Example 14 | ◎ | ◎ | ◎ | ◎ | ◎ | ◎ | ○ | ◎++ |
| Example 15 | ◎ | ◎ | ◎ | ◎ | ◎ | ○ | ○ | ◎++ |
| Example 16 | ◎ | ◎ | ◎ | ◎ | ○ | △ | ○ | ◎+ |
| Example 17 | ○ | △ | ○ | ◎ | ○ | ◎ | ○ | ○++ |
| Example 18 | ○ | △ | ○ | ◎ | ○ | ◎ | ○ | ○++ |
| Example 19 | ◎ | ◎ | ◎ | ◎ | ◎ | ○ | ○ | ◎++ |
| Example 20 | ◎ | ◎ | ○ | ◎ | ◎ | ○ | ○ | ◎+ |
| Example 21 | ◎ | ◎ | ○ | ◎ | ○ | △ | ○ | ◎ |
| Example 22 | ○ | △ | △ | △ | ○ | ○ | ○ | △ |
| Example 23 | ○ | △ | ○ | ○ | △ | △ | ○ | △ |
| Example 24 | ○ | △ | △ | △ | ○ | ◎ | △ | △ |
| Example 25 | ◎ | ○ | △ | △ | △ | △ | ○ | △ |
| Example 26 | ○ | △ | △ | △ | ○ | ◎ | △ | △ |
| Example 27 | ◎ | ○ | △ | △ | × | △ | ○ | △ |
| Comparative Example 1 | ○ | × | × | × | × | ○ | × | × |
| Comparative Example 2 | ◎ | △ | × | × | △ | × | ○ | × |
| Comparative Example 3 | ◎ | △ | △ | × | × | △ | ○ | × |
| Comparative Example 4 | ○ | △ | △ | × | × | × | △ | × |
| Comparative Example 5 | ○ | × | ○ | × | △ | ○ | × | × |
| Comparative Example 6 | × | × | × | × | △ | △ | ○ | × |

TABLE 2-continued

| | | | | | | | | |
|---|---|---|---|---|---|---|---|---|
| Comparative Example 7 | X | X | X | X | Δ | Δ | ○ | X |
| Comparative Example 8 | ◎ | X | X | X | X | X | ○ | X |

※Evaluation Criteria for Each Performance
Evaluation   Grade (A)
◎     3
○     2
Δ     1
X     0

※Weighting for Grade of Each Performance
Performance                     Weighting for Grade (w)
Contact Angle (Initial)                 1
Contact Angle                           2
(After Running Water)
Wettability                             1
Contamination Resistance                2
Recovery Performance
Adhesion                                1
Lubricity                               1
Liquid Stability                        1

※The grade of each performance is multiplied by the weighting to provide the comprehensive evaluation.
Comprehensive evaluation = ΣwA ※Comprehensive Evaluation Criteria
Max; 26 points
Evaluation   Grade
◎++          25-26
◎+           23-24
◎            21-22
○++          19-20
○+           17-18
○            15-16
Δ            12-14
X            ~11

As shown in Table 2, the hydrophilic coating compositions according to Examples 1 to 27 have succeeded in forming coating films of the water-based hydrophilic coating compositions which are favorable in sustaining hydrophilicity of coating film on base material, and excellent in self-cleaning ability to easily remove even stains such as penetrative oil stains.

However, the water-based hydrophilic coating compositions according to Examples 22 and 23 outside the preferred range of the combination ratio a/b of the colloidal silica (a) to organoalkoxysilane (b) of the inorganic compound (A), or Examples 24 and 25 outside the preferred range of combination ratio A/B of the inorganic compound (A) to the water-soluble resin (B), moreover, Examples 26 and 27 outside the preferred range of the combination ratio C/(A+B) of the amorphous silica (C) represented by $M_2O \cdot SiO_2$, where the mass ratio of $M_2O/SiO_2$ is from 0.05 to 0.3, to the sum of the inorganic compound (A) and water-soluble resin (B), resulted in sustaining hydrophilicity somewhat decreased as compared with Examples 1 to 21.

In contrast, comparative example 1 containing no colloidal silica (a), comparative example 2 containing no organoalkoxysilane (b), and comparative example 3 containing no colloidal silica (a) and no organoalkoxysilane (b) failed to form tough coating films of inorganic compound, thus leading to significant decrease in sustaining hydrophilicity, wettability, and contamination resistance recovery performance.

Moreover, comparative example 4 containing no water-soluble resin (B), comparative example 5 containing no amorphous silica (C) represented by $M_2O \cdot SiO_2$, where the mass ratio of $M_2O/SiO_2$ is from 0.05 to 0.3, and comparative examples 6 to 8 obtained by applying only the inorganic compound (A), the water-soluble resin (B), and the amorphous silica (C) represented by $M_2O \cdot SiO_2$, where the mass ratio of $M_2O/SiO_2$ is from 0.05 to 0.3, also resulted in significant decrease in sustaining hydrophilicity, wettability, and contamination resistance recovery performance.

The invention claimed is:

1. A water-based hydrophilic coating composition obtained by adding to a liquid medium:
    an inorganic compound (A) having colloidal silica (a) modified with at least one or more of organoalkoxysilane compounds (b) having one or more groups selected from the group consisting of a glycidyl group, a vinyl group and an amino group;
    a water-soluble resin (B); and
    amorphous silica (C) represented by $M_2O \cdot SiO_2$,
    wherein M represents an alkali metal and the mass ratio of $M_2O/SiO_2$ is from 0.05 to 0.3, and
    wherein a mass ratio (a/b) of the component (a) to the component (b) in the inorganic compound (A) is from 0.25 to 4.

2. The water-based hydrophilic coating composition according to claim 1, wherein a mass ratio (A/B) of the inorganic compound (A) to the water-soluble resin (B) is from 1.0 to 9.0.

3. The water-based hydrophilic coating composition according to claim 1, wherein a mass ratio (C/[A+B]) of the amorphous silica (C) to the sum of the inorganic compound (A) and water-soluble resin (B) is from 0.05 to 0.2.

4. A method for treating a surface comprising:
    applying the water-based hydrophilic coating composition according to claim 1 to the surface; and
    drying the water-based hydrophilic coating composition.

5. The method according to claim 4, wherein a mass ratio (A/B) of the inorganic compound (A) to the water-soluble resin (B) is from 1.0 to 9.0.

6. The method according to claim 4, wherein a mass ratio (C/[A+B]) of the amorphous silica (C) to the sum of the inorganic compound (A) and water-soluble resin (B) is from 0.05 to 0.2.

7. The method according to claim 4, wherein the surface is a surface of a material selected from the group consisting of metals, metallic alloys, plastics and glass, or a surface of a film provided on the material, wherein the film comprises one or more layers.

8. A surface-treated material comprising at least one surface, wherein the surface is treated by the method according to claim 4.

9. A water-based hydrophilic coating composition obtained by adding to a liquid medium:
an inorganic compound (A) having colloidal silica (a) modified with at least one or more of organoalkoxysilane compounds (b) having one or more groups selected from the group consisting of a glycidyl group, a vinyl group and an amino group;
a water-soluble resin (B); and
amorphous silica (C) represented by $M_2O \cdot SiO_2$,
wherein M represents an alkali metal and the mass ratio of $M_2O/SiO_2$ is from 0.05 to 0.3, and
wherein a mass ratio (A/B) of the inorganic compound (A) to the water-soluble resin (B) is from 2.0 to 9.0.

10. The water-based hydrophilic coating composition according to claim 9, wherein a mass ratio (C/[A+B]) of the amorphous silica (C) to the sum of the inorganic compound (A) and water-soluble resin (B) is from 0.05 to 0.2.

11. A method for treating a surface, comprising:
applying the water-based hydrophilic coating composition according to claim 9 to the surface, and
drying the water-based hydrophilic coating composition.

12. The method according to claim 11, wherein a mass ratio (C/[A+B]) of the amorphous silica (C) to the sum of the inorganic compound (A) and water-soluble resin (B) is from 0.05 to 0.2.

13. The method according to claim 11, wherein the surface is a surface of a material selected from the group consisting of metals, metallic alloys, plastics and glass, or a surface of a film provided on the material, wherein the film comprises one or more layers.

14. A surface-treated material having at least one surface, wherein the surface is treated by the method according to claim 11.

* * * * *